United States Patent [19]

Wolfe

[11] Patent Number: 5,863,312
[45] Date of Patent: *Jan. 26, 1999

[54] NON-ENTRAINING FILTER

[76] Inventor: Michael Wolfe, 101 W. 90th St., New York, N.Y. 10024

[ * ] Notice: The term of this patent shall not extend beyond the expiration date of Pat. No. 5,312,467.

[21] Appl. No.: 961,728

[22] Filed: Oct. 31, 1997

Related U.S. Application Data

[63] Continuation of Ser. No. 462,844, Jun. 5, 1995, abandoned, which is a continuation-in-part of Ser. No. 233,245, Apr. 26, 1994, Pat. No. 5,492,551, which is a continuation-in-part of Ser. No. 965,764, Oct. 23, 1992, Pat. No. 5,312,467.

[51] Int. Cl.$^6$ ............................................. B01D 46/00
[52] U.S. Cl. ........................ 55/495; 55/511; 55/522; 55/527; 55/DIG. 35
[58] Field of Search ......................... 5/414; 55/493, 55/495, 496, 500, 511, 522, 523, 525, 527, 528, DIG. 33, DIG. 35, DIG. 39, DIG. 45

[56] References Cited

U.S. PATENT DOCUMENTS

| | | | |
|---|---|---|---|
| 1,292,095 | 1/1919 | Schwartz . | |
| 2,081,779 | 5/1937 | Titus | 128/146 |
| 2,447,450 | 8/1948 | Williams | 128/146 |
| 2,565,124 | 8/1951 | Durborow | 128/146 |
| 2,697,843 | 12/1954 | Skrmetti | 5/414 |
| 2,787,264 | 4/1957 | Thiebault | 128/146 |
| 3,220,409 | 11/1965 | Liloia et al. | 128/146 |
| 3,664,335 | 5/1972 | Boucher et al. | 128/146.6 |
| 3,971,369 | 7/1976 | Aspelin et al. | 128/146.2 |
| 4,004,584 | 1/1977 | Geaney | 128/140 N |
| 4,319,567 | 3/1982 | Magidson | 128/206.19 |
| 4,359,792 | 11/1982 | Dale | 5/414 |
| 4,384,577 | 5/1983 | Huber et al. | 128/206.19 |
| 4,641,645 | 2/1987 | Tayebi | 128/206.19 |
| 4,852,598 | 8/1989 | Griesenbeck | 5/414 |
| 4,984,302 | 1/1991 | Lincoln | 2/206 |
| 5,265,280 | 11/1993 | Walsh | 2/206 |
| 5,312,467 | 5/1994 | Wolfe | 55/493 |
| 5,492,551 | 2/1996 | Wolfe | 55/496 |

FOREIGN PATENT DOCUMENTS

| | | | |
|---|---|---|---|
| 0447166 | 9/1991 | European Pat. Off. | 55/DIG. 39 |
| 1-99656 | 4/1989 | Japan | 55/DIG. 39 |
| 4789 | 12/1912 | United Kingdom . | |
| 5104 | 12/1913 | United Kingdom . | |

OTHER PUBLICATIONS

"Electret Filters for High–Efficiency and High–Flow Air Cleaning", IEEE Transactions on Industry Applications, vol. IA–17, No. 2 (Mar./Apr. 1981) pp. 240–248.

Henry I. Smith et al., "X–ray Lithography, from 500 to 33nm: X–ray Nanolithography" IBM J. Res. Develop. vol. 33, No. 3, May 1993, pp. 319–329.

D. Saulys et al., "Scanning Tunneling Microscopy Assisted Oxide Surface Etching", Journal Applied Physics 69 (3), Feb. 1, 1991, pp. 1707–1711.

Y. Mizutani et al. "Microporous Polypropylene Sheets", Ind. Eng. Chem. Res., vol. 32, No. 1, 1993, pp. 221–227.

Tetko Inc.—Screening and Filtration Media Product Catalog, pp. 2 and 23.

*Primary Examiner*—C. Scott Bushey
*Attorney, Agent, or Firm*—Bryan Cave LLP

[57] ABSTRACT

A face mask for covering a wearer's mouth, nose or both, with a single layer non-entraining filter medium which repulses or rejects particulate matter rather than catching or entraining particulate matter.

14 Claims, 1 Drawing Sheet

NON-ENTRAINING FILTER

CROSS REFERENCE TO RELATED APPLICATIONS

This is a continuation of U.S. application Ser. No. 08/462,844, filed Jun. 5, 1995, now abandoned which is a continuation-in-part application of U.S. patent application Ser. No. 08/233,245, filed Apr. 26, 1994, now U.S. Pat. No. 5,492,551, which is a continuation-in-part of U.S. patent application Ser. No. 07/965,764, filed Oct. 23, 1996, now U.S. Pat. No. 5,312,467, the contents of each of which are incorporated herein by reference.

BACKGROUND OF THE INVENTION

This invention relates to face masks, and more particularly to face masks wherein the filter consists of a repulsive filtering media.

Face masks are well known in the prior art, especially for industrial and medical purposes. Early face masks were made from cloth, such as gauze or linen, and usually consisted of a plurality of layers (see U.S. Pat. No. 1,292,095). While these masks had good air permeability, they had poor filtration ability. As such, they were suitable for filtering large dust particles, but were poor at filtering small particles, e.g. pollen and microbes. The layers of cloth would entrap various particulate matter, and even though the cloth might have been washable, washing would not remove all of the particles. The constant necessity for washing also caused wear and deterioration of the filtering medium. These cloth type filter mediums were also poor at maintaining a specific filtering accuracy.

Non-woven, melt blown or molded filters of a mat matrix (e.g. U.S. Pat. No. 3,220,409) provide a filtering medium that is suitable for filtering smaller particles than cloth type filters. Like cloth filters, these mat filters entrain particulates on or within the matrix medium. They are also absorbent and cannot be washed or cleaned because the filtering medium would fall apart. These filters have a very limited life and are known as "disposables". In order to achieve a greater filtering ability, the mat matrix mediums of these filters have a built up thickness and an indirect air flow through the medium so that they have a reduced air permeability and require a stronger breathing effort.

There exists a need for a face mask with a filter medium having a high degree of filtration, a high air permeability capacity, that does not clog or entrain particulate matter, that has a long life, and that has a wide range of applications.

SUMMARY OF THE INVENTION

The present invention is a face mask for covering the wearer's mouth, nose or both. The mask uses a filter media consisting of a single layer material with micron small pore openings. The filter material is not layered or constructed of mat matrixed material, it operates by preventing the passage of particulate matter by repulsing means, that is, by restriction of the particulate matter from penetrating the surface of the material rather than by catching or entraining the particulates within the material. The single layer material filter provides a more direct route for air through more directly open pores thereby creating a filter with a high air permeability capacity. This makes it easier to breath without strain while wearing a mask using this filter, and also permits the mask to be used in high volume respiratory situations such as heavy work or sports. The filtering material used preferably has a relatively smooth surface. This reduces the tendency of particulate matter to become entangled or caught within the medium unlike prior art filters for example, that are made of natural cloth which act as entangling fibers. The object of the smooth surface single layer of the present filter is to eliminate or greatly reduce particle entrainment and to increase the deflecting ability of the filter material itself. The filtering material may also be electrostatically treated to add to the deflecting ability. The filtering material itself is preferably non-elastic, so that the size of the filter pores is relatively stable, thereby maintaining filtering accuracy.

The mask and media may be used for medical (surgical, dental) applications, for industrial applications, e.g. to filter dust, particles or vapors in mills, for personal use such as by persons with pulmonary problems such as asthma, for sports activities, e.g. jogging in dusty conditions or motocross, as well as for many other uses where there is a desire to prevent the passage of vapors, particulate or biological matter.

One object of the present invention is to provide air filtering means that prevents the passage of small size particulate matter by repulsive means, without collection or entrainment of the particulate matter in or on the filtering medium.

Another object of the present invention is to provide a filter for a mask that, due to little or no entrainment, does not load up and has a long usage life, is washable, and is a permanent rather than a disposable filter.

Another object of the present invention is to provide a filtering material that has a relatively high air permeability.

Another object of the present invention is to provide a filtering medium that is self-cleaning and thereby eliminate or substantially reduce the need for cleaning or short term replacement.

These and other objects and advantages of the present invention will be better understood by those skilled in the art from the following description of a preferred embodiment, claims and appended drawings.

DETAILED DESCRIPTION OF THE DRAWINGS

Figure 1:
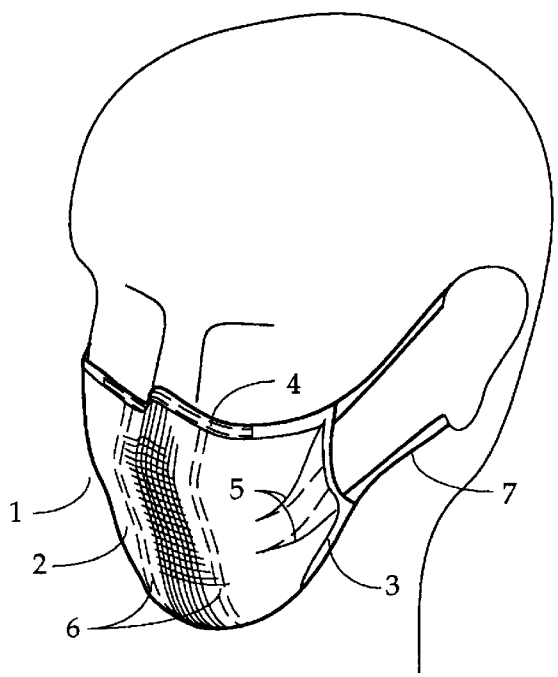
FIG. 1 is a perspective view of the filtering face mask of the present invention with seamed edges.
Figure 2:
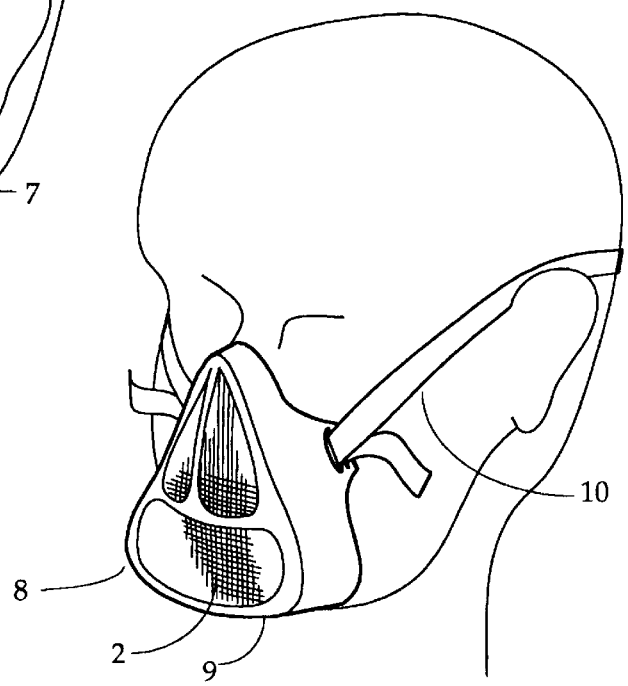
FIG. 2 is a perspective view of the filtering face mask of the present invention with a semi-rigid frame.

The filtering medium 2 of the present invention may be fabricated where the filtering medium itself can be fashioned by pleating and seeming to create a flexibly cupped yet closely fitting mask as in FIG. 1 or used in conjunction with a semi-rigid frame in which the filtering medium may be part of, or set into as in FIG. 2.

FIG. 1 shows a face mask with seamed edging of the type generally associated with medical or personal use. The face mask 1 consists of a non-elastic filter medium 2 which is preferably constructed of a woven microfilament material that is seamed over at its edge to create edging 3. The edging 3 can be created by sewing, heat sealing or UV sealing the filter material to itself, or by any other known method such as by chemical bonding or by attaching a strip of material, which may be elastic, to the filter medium. A soft metallic strip or other formable material 4 can be attached to or placed within the upper seaming to enable the wearer to form a close fit between the filter and the bridge of the nose. Pleats 5 can be formed in the filter material to create a cupping of the mask about the face. Alternatively, ribs 6 or additional seaming may be used to keep the filtering material from collapsing on the mouth of the wearer during inhalation. An elastic strap 7 can be attached to the seamed edge 3 of the mask 1 by any known means.

Figure 3:
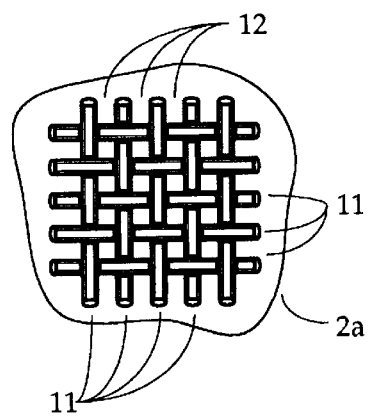
FIG. 3 is an enlarged section of woven filtering medium of one embodiment of the present invention.

There are several materials and processes that are suitable to create a single layer filtering medium 2 with repulsing abilities. FIG. 3 shows an enlarged view of one such material 2*a*, a woven microfilament material preferably constructed of smooth surfaced monofilament strands 11 of synthetic material such as polyester, nylon, or polypropylene, but which may also be constructed of materials such as carbon, ceramic, metal strands, or any other appropriate materials. The strands of these materials may be calendered to set the strands into more permanent fixed positions. A woven material made of strands 11 of approximately 30$\mu$ diameter polyester or less, spaced with openings 12, 15$\mu$ to 20$\mu$ at most, would be an excellent material for the filtering of particulate matter such as pollen while having an ease of breathability. Smaller diameter strands 11 spaced with the same dimension between strands 12, increases % openness and air permeability while reducing the spacing between the strands enables smaller particulates to be filtered. An openness of at least 12% is good for most applications while certain low respiration applications an openness as low as 8% could be used.

Figure 4:
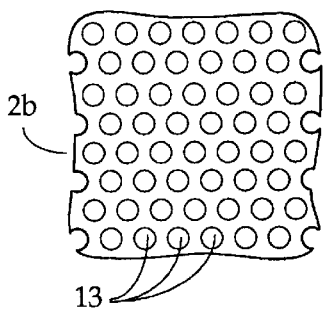
FIG. 4 is an enlarged section of a non-woven filtering medium, such as a filter having holes cut by a laser, another embodiment of the present invention.
Figure 5:
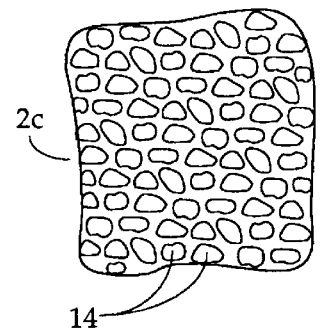
FIG. 5 is an enlarged section of a non-woven filtering medium, such as a filter having pores created by chemically etching a single ply membrane, another embodiment of the present invention.

FIG. 4 shows another suitable material 2*b* created by cutting holes 13, such as by lasers, through a single-layer sheet of material or by etching through a membrane with techniques such as X-ray lithography can result in pore holes 13 with dimensions of around 0.01$\mu$, small enough to limit the particles in smog. FIG. 5 shows an alternate material 2*c*, which may be a biaxial stretched sheet such as polypropylene which uses micro fillers to cause micro pore openings 14. One such material is marketed as "Tokuso NF". This material has pore openings in the sub-micron range. Another example is a filter created by chemically etching micropores through a single layer material.

While there are numerous methods to create the filter medium 2 of the present invention, the principal object of the invention is to provide a mask with a filter medium which repulses particulate matter rather than entraining the particulate matter. If some particulate matter did, inadvertently, get caught on the surface of the filtering medium during inhalation, that particulate matter would inversely be pushed off during exhalation.

FIG. 2 shows a face mask 8 with the filtering media 2 set into, or a part of, a semi-rigid frame 9 of the type more generally used in industry. The filter medium 2 fits into the frame 9 and can be permanently attached again by any known means, or removably inserted into the mask frame. A strap 10 which is preferably elastic or may be an adjustable type attaches to the mask frame 9 and can fit around the back of the head. The materials for constructing the filtering material described above are generally strong enough to withstand repeated washings and medical sterilization. For example polyester has a softening point of 428° F.–464° F. with dimensional stability to over 260° F. while typical autoclave sterilization temperatures range from 220° F–280° F. These materials are also resistant to chemical washes to varying degrees.

"Allergenic pollens are generally larger than 15 microns in diameter. For example, pollen from Ambrosia (ragweed) is oblate-spheroid in shape and it's size ranges between 22–29 microns by 22–32 microns. Pollens from the Asteraceae family (herbs and weeds) range between 15–48 microns by 16–40 microns. The many pollens of the Poaceae family (grasses) have a generally spheroid shape ranging in size from 22–122 microns. For example, Lolium (Rye grass) pollen ranges between 32–45 microns. The tree family pollens include, for examples, Betula (birch) pollen ranging in size from 18–23 micron by 21–30 microns, Alnus (alder) pollen ranging from 19–21 microns by 23–30 microns, Olea (olive) pollen ranging from 22–31 microns by 22–28 microns and Quercus (oak) pollen ranging from 22–36 microns by 19–39 microns. From the foregoing, it should therefore be understood that a filtering medium 2 having microfilament strands 11 spaced apart at approximately 15 microns will prevent the passage therethrough of most air-borne pollens. Small particulate matter and allergenic pollens are usually larger than 15 microns, with most above 20 microns in diameter. Particles in smog range down to 0.01 microns. Air ventilation systems in buildings generally include air filters that require mechanical blowers and other large equipment to force air through the filtering media. The size of the openings in either embodiment will depend upon the size of the particles which are to be repelled. For repelling pollen and the like, the opening are preferably on the order of 20 microns or less. For repelling particles in smog and the like, the openings, may be as small as 0.01 micron. In an alternative embodiment, the filter includes a single-ply sheet of a filtering material having openings cut therein. Each opening has a maximum diameter less than the minimum diameter of the particles to be filtered for preventing the particles from being passed through the filter. The filtering material preferably has a smooth outer surface facing the air-flow for preventing the particles from clogging the filter. The openings may be cut into the filter material by any appropriate cutting means, such as by laser cutting, x-ray lithography or chemical etching."

The pore openings of the filtering mediums 2 used here may be configured for various uses and applications. For instance a medium with pore openings of 100$\mu$ or less would be useful to prevent the passage of heavy industrial dust, pore openings of approximately 15$\mu$ or less for particulate matter such as spores and pollen, 0.5$\mu$ for bacteria and small fly ash, 0.01 or less for smog, tobacco smoke, or soot, and generally 0.002$\mu$ for the prevention of passage of viruses. The pore openings could be designed to such a fine size, as to restrict the passage of one gas molecule, say $CO_2$, in preference of another, say $O_2$.

Various changes, additions, different combinations and modifications may be made to the present invention without departing from its spirit and scope. Such changes, additions and modifications within a fair reading of the appending claims are intended as part of the present disclosure.

I claim:

1. An air filter comprising a single layer non-entraining filter material having openings for filtering particles 15 microns or greater in diameter and means for supporting the single layer non-entraining filter material in a stream of air, wherein said filter allows the passage of air through said air filter.

2. The filter according to claim 1 wherein the single layer non-entraining filter material is a woven filtering medium.

3. The filter according to claim 1 wherein the single layer non-entraining filter material is a synthetic woven filtering medium.

4. The filter according to claim 1 wherein the single layer non-entraining filter material has an openness of at least 8%.

5. The filter according to claim 1 wherein the single layer non-entraining filter material comprises calendared cylindrical strands.

6. The filter according to claim 1 wherein the single layer non-entraining filter material is electrostatically treated or charged.

7. The filter according to claim 1 wherein the single layer non-entraining filter material comprises a single-ply sheet comprising a plurality of holes in the sheet, each hole having a maximum size less than the minimum size of the particles to be filtered, the filter having a smooth outer surface in a direction of air-flow.

8. The filter according to claim 7 wherein the single layer non-entraining filter material is manufactured by a process comprising the steps of:
   a) providing a single-ply sheet of a filtering material having a substantially continuous surface; and
   b) making a plurality of holes in the sheet of filtering material, each hole having a maximum diameter less than the minimum diameter of the particles to be filtered.

9. The filter according to claim 8 wherein the hole making step comprising a method selected from the group consisting of laser cutting, x-ray lithography, chemical etching, or stretching a microporous sheet.

10. The filter according to claim 1 wherein the single layer non-entraining filter material comprises openings sized to prevent the passage of at least some pollen therethrough.

11. The filter according to claim 1 wherein the single layer non-entraining filter material comprises openings of less than 100 microns for filtering heavy industrial dust.

12. The filter according to claim 3 wherein the synthetic woven filtering medium comprises a plurality of spaced-apart strands having a diameter of less than 30 microns wherein the space between the strands is 50 microns or less.

13. An air filter comprising a single layer non-entraining filter material having pore openings of at least 0.5 microns and at most 100 microns for filtering particles and means for supporting the single layer non-entraining filter material in a stream of air, wherein said filter allows the passage of air through said air filter.

14. The filter according to claim 13 wherein the single layer non-entraining filter material comprises openings of at least 15 microns for filtering spores and pollen.

* * * * *